H. B. JONES.
INDICATOR FOR LIQUID TANKS.
APPLICATION FILED MAR. 22, 1915.
1,261,819.
Patented Apr. 9, 1918.
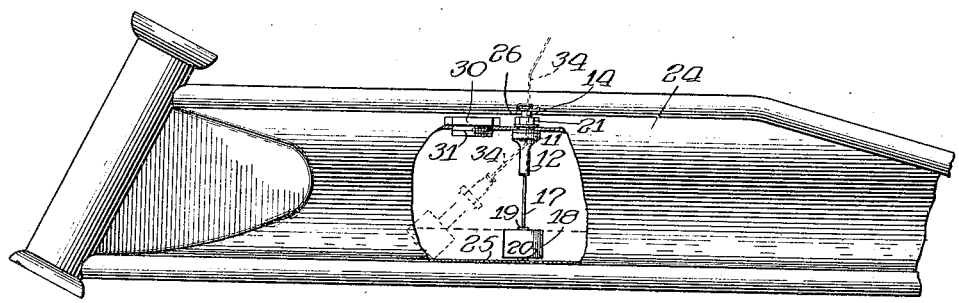
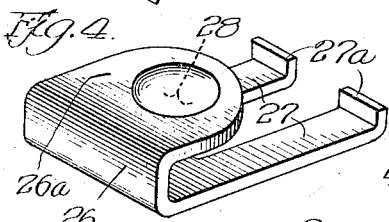
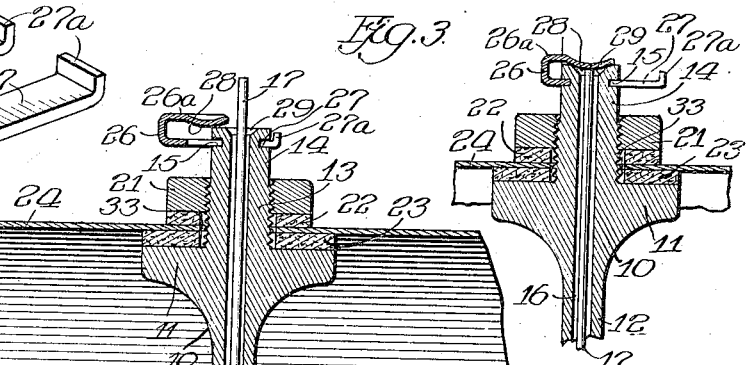
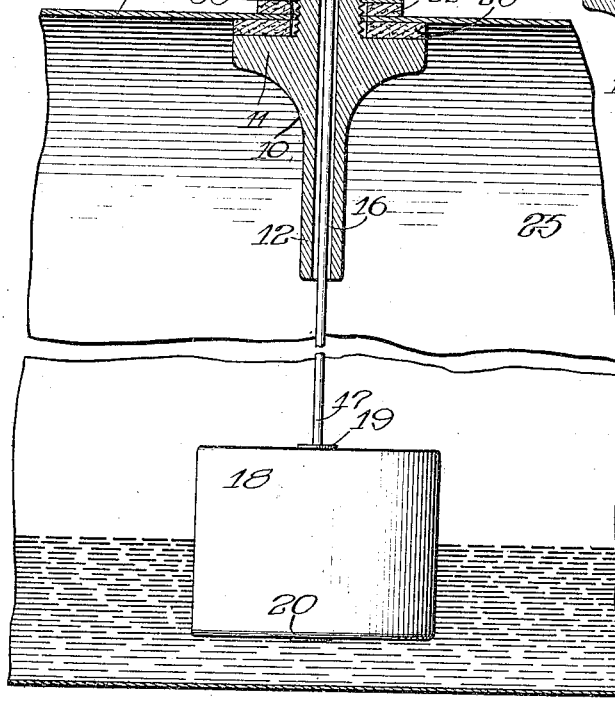
Witnesses:
Inventor
Howard B. Jones
By Luther Johns, Atty.

though it is to be understood that the claims
herein are not limited to any particular location of the openings 33.

UNITED STATES PATENT OFFICE.

HOWARD B. JONES, OF EVANSTON, ILLINOIS.

INDICATOR FOR LIQUID-TANKS.

1,261,819.   Specification of Letters Patent.   Patented Apr. 9, 1918.

Application filed March 22, 1915. Serial No. 16,195.

*To all whom it may concern:*

Be it known that I, HOWARD B. JONES, a citizen of the United States, and resident of Evanston, in the county of Cook and State of Illinois, have invented certain new and useful Improvements in Indicators for Liquid-Tanks, of which the following is a specification.

My invention relates to indicators for liquid tanks. Its principal objects are to provide simple, cheap, easily applied and effective means for indicating in a general way the amount of liquid remaining in the tank. A particular object is to provide a simple form of an indicating device which may readily be installed in tanks now in use. Further objects and advantages will appear hereinafter.

My improved indicator is well adapted for use on the fuel tanks of motorcycles, automobiles and the like, and in the accompanying drawings, which form a part of this specification, Figure 1 shows its application, in a preferred form, to a motorcycle gasolene tank of a well known type, the tank being partly broken away to show the device in operative position, as well as the manner of placing it in such position.

Fig. 2 is a vertical medial section through the indicator and tank on an enlarged scale.

Fig. 3 is a fragmentary view, in section as in Fig. 2, showing the indicator rod held in depressed position; and Fig. 4 is a perspective view of the preferred form of rod holding and releasing means.

My improved indicator comprises the rod supporting and guiding element 10 having the annular flange 11, the extension 12 to give a better support for the rod, the threaded portion 13, and the upper end portion 14; this upper portion 14 being provided with an annular groove 15 in the preferred construction. These several parts denominated generally as 10 are preferably made integral with each other, and may be a casting or be turned out by hand or automatic machines in ways well known in the mechanic arts. The element 10 is bored longitudinally to provide the guide-way 16 for the indicator rod 17 carrying the float 18 (suitably of cork with a coating of shellac) held in position by washers 19 and 20, secured as by soldering to the rod 17. A nut 21 is on the threaded portion 13, which nut in conjunction with the flange 11 binds the leather, rubber, or other suitable washers 22 and 23 in sealing contact with the upper and under sides respectively of the top wall 24 of the tank 25. The flange 11 and washer 23 are preferably of somewhat greater diameter than are the nut 21 and washer 22 in order that greater friction may be had upon the element 10 than upon the nut 21 to facilitate the tightening or loosening of the nut.

The sliding element 26 constitutes means for releasably holding the indicator rod 17 in depressed position. It is also preferably provided with means for sealing the opening 16 in the element 10 to prevent loss of gasolene by volatilization. It is preferably made from thin sheet metal, formed to provide the two arms 27, the ends 27ª thereof being bent to prevent separation of the element 26 from the element 10 when it is in operative position in the annular groove 15. It also has an upper turned over portion 26ª, which is preferably provided with a convex surface 28 adapted to snap by spring pressure partially into the recess or enlargement 29 of the hole 16 in the upper end 14 of the element 10. As the surface 28 is adapted to press upon the upper end of the portion 14, its engagement with the walls thereof about the opening 29, as in Fig. 3, prevents accidental retraction of the element 26 and provides a valve-like connection closing this recess 29 and the hole 16.

My improved indicator may be applied to tanks by the manufacturer of such tanks in the first instance; but an important use of the device is in cases where it is desired to install an indicator in tanks already in service. Motorcycle tanks, for instance, are not ordinarily provided with indicators. For such purposes it has been suggested to provide an indicator in connection with the cap 30 for the filling or charging port 31. Aside from certain disadvantages of such devices, it is common at the present time to employ the cap 30 for the important purpose of carrying a priming gun with which the motorcyclist may charge the cylinders with fuel when desired. When my improved indicator is installed it is entirely free and independent of the cap 30 and filling port 31.

In applying my improved indicator in practice I first make an opening 33 in the top 24 of the tank, which opening 33 is preferably within easy reach of the motorcyclist when on his machine. It may be at any reasonable distance from the charging port 31, In practice this hole 33 is preferably only about a quarter of an inch in diameter, the diameter of the threaded portion 13 of the element 10 being somewhat less than the diameter of the hole 33. Preferably at the free end of the rod 17 I secure for temporary use a lifting and pulling element, suitably a thin wire 34 secured to the rod as by soldering. For commercial purposes the rod 17 is long enough for application to tanks of various depths and is longer than when actually in use. The hole 33 having been made in the tank, the wire 34 is passed downward into the opening 31 and caused to come out through the hole 33. The rod 17 having the float 18, the supporting and guiding element 10 and the washer 23 upon it is then passed into the interior of the tank through the opening 31. By drawing upon the wire 34 the rod 17 and connected parts are readily brought into normal position, as shown in the drawings, whereupon the washer 22 and nut 21 are applied and the nut tightened. The float 18 is permitted to descend to its lowermost position, the rod 17 is marked at the top of the portion 14 and the rod 17 is then cut off, as by nippers, slightly below the top of the portion 14. When the operator desires to determine aproximately the amount of liquid in the tank he moves the element 16 from its position in Fig. 3 to that of Fig. 2 whereupon the rod 17 rises under the influence of the float.

Such a gage is intended primarily to keep the operator advised only approximately of the quantity of liquid in the tank. When the rod 17 rises but slightly it is a warning to the operator at a time when there is still enough liquid remaining to carry him to a source of supply.

While I have illustrated and described a preferred embodiment of these improvements various changes may be made in details of construction without departing from the spirit of the invention, and all such changes are contemplated by me as fall within the scope of the appended claims.

I claim:

1. The combination of a tank for a liquid having a top wall with an opening therein for an indicator supporting and guiding member, an indicator supporting and guiding member longitudinally apertured and having a flange intermediate its ends, the normally upper portion of said member being threaded and positioned in said top wall opening, a nut on said threaded portion, said nut and said flange being opposed to each other and adapted to clamp the top wall of the tank between them about the opening thereof, an indicator rod loosely positioned in said longitudinal aperture, said longitudinal aperture and said rod being substantially vertical when in operative position, a float on said rod, and means for releasably holding said rod and float in normally depressed position.

2. An indicator for a liquid tank comprising in combination a supporting and guiding element, means thereon for clamping said element upon a wall of a liquid tank whereby part of said element may be within said tank and part thereof without said tank, said element having an opening therethrough for an indicator rod, an indicator rod loosely positioned in said opening, a float on said rod, the normally upper portion of said element having an annular groove, and a sliding element in said groove and having a portion thereof adapted to overlie said opening containing said rod in one position of said sliding element.

3. An indicator for a liquid tank comprising in combination a guiding and supporting element, means thereon including a flange adapted to be positioned within the tank and a binding nut outside the tank for clamping the same about an opening in the top wall of such liquid tank, said element having a normally vertical opening therethrough for an indicator rod, an indicator rod in said opening, a float on said rod, and means carried by said element adapted to overlie said opening containing said rod in one operative position of said means, said overlying means being adapted readily to be moved out of such overlying position.

4. An indicator for a liquid tank comprising in combination a guiding and supporting element having an opening therethrough, and means for clamping said element about an opening in a liquid tank, an indicator rod in the opening through said element, a float on said rod, and spring pressed means for simultaneously sealing the opening in said element and holding said rod against passage therethrough in one direction.

5. An indicator for a liquid tank comprising in combination a guiding and supporting element having a passageway therethrough for an indicator rod, and means for holding said element in an opening in a liquid tank, an indicator rod loosely positioned in said passage-way, a float on said rod, a slidably mounted element on the normally upper portion of said guiding and supporting element and having a portion thereof adapted to overlie said passage-way and rod and to constitute a valve for sealing said passage-way, and to provide an obstruction to the passage of said rod through said passage-way in one direction, said holding and valve element being adapted to be moved out of such holding and sealing position.

6. The combination of a tank for a liquid, said tank having a charging port therein and a second smaller opening spaced from said charging port, a guiding and supporting element and means for clamping the same in said second opening, said guiding and supporting element being adapted to be inserted into said tank through said charging port and brought into position in said second opening from within the tank, said guiding and supporting element having a passage-way therethrough, an indicator rod loosely positioned in said passage-way, a float on said rod, a portion of said guiding and supporting element being without said tank when in operative position, said outside portion having an annular groove, a holding element slidably mounted in said annular groove, a portion of said holding element being adapted to overlie said passage-way and said rod in one operative position thereof and to provide thereby an obstruction to the passage of said rod through said passage-way in one direction.

HOWARD B. JONES.

Witnesses:
M. M. KRIESAND,
T. D. BUTLER.

Copies of this patent may be obtained for five cents each, by addressing the "Commissioner of Patents, Washington, D. C."